United States Patent
Lee (10) Patent No.: US 9,620,304 B2
(45) Date of Patent: Apr. 11, 2017

(54) INTERLOCK DEVICE OF RING MAIN UNIT

(71) Applicant: LSIS CO., LTD., Anyang-si, Gyeonggi-do (KR)

(72) Inventor: Dong Sik Lee, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/793,529

(22) Filed: Jul. 7, 2015

(65) Prior Publication Data
US 2016/0217942 A1    Jul. 28, 2016

(30) Foreign Application Priority Data

Jan. 22, 2015   (KR) .......................... 10-2015-0010786

(51) Int. Cl.
*H01H 9/20*     (2006.01)
*H01H 71/02*    (2006.01)
(Continued)

(52) U.S. Cl.
CPC ............. *H01H 9/20* (2013.01); *H01H 9/04* (2013.01); *H01H 31/06* (2013.01); *H01H 71/02* (2013.01);
(Continued)

(58) Field of Classification Search
CPC   H01H 9/04; H01H 9/20; H01H 71/02; H01H 31/06; H01H 9/22; H02B 11/26; H02B 7/01
(Continued)

(56) References Cited

U.S. PATENT DOCUMENTS 1,893,829 A * 1/1933 Hammerly ............... H01H 9/22
                                                      200/50.13
3,009,035 A * 11/1961 Reichert ................... H01H 9/22
                                                      337/163
(Continued)

FOREIGN PATENT DOCUMENTS

CN      202796545           3/2013
CN      202796545 U  *      3/2013  ............... H01H 9/22
(Continued)

OTHER PUBLICATIONS

European Patent Office Application No. 15177472.6, Search Report dated May 25, 2016, 9 pages.
(Continued)

*Primary Examiner* — Anatoly Vortman
(74) *Attorney, Agent, or Firm* — Lee, Hong, Degerman, Kang & Waimey (57) ABSTRACT

The present invention relates to an interlock device of a ring main unit, and more particularly, to an interlock device of a ring main unit in which a fuse cover can be closed in interlock with a cable cover.

An interlock device of a ring main unit according to an embodiment of the present disclosure may include an interlock frame provided in part of the ring main unit, a cam on part of which an engaging portion is protruded and formed and on the other part of which a slit is formed, rotatably provided within the interlock frame, an operating plate an end of which is coupled to the slit to perform a vertical movement, and a spring an end of which is fixed to part of the cam to store an elastic force due to the movement of the cam.

9 Claims, 10 Drawing Sheets

(51) Int. Cl.
*H01H 9/04* (2006.01)
*H01H 31/06* (2006.01)
*H01H 9/22* (2006.01)
*H02B 7/01* (2006.01)
*H02B 11/26* (2006.01)
*H01H 85/25* (2006.01)

(52) U.S. Cl.
CPC ............... *H01H 9/22* (2013.01); *H01H 85/25* (2013.01); *H02B 7/01* (2013.01); *H02B 11/26* (2013.01)

(58) Field of Classification Search
USPC .......................... 337/201; 361/615, 616, 626
See application file for complete search history.

(56) References Cited

U.S. PATENT DOCUMENTS

| | | | | |
|---|---|---|---|---|
| 3,009,036 | A | * | 11/1961 | Dorfman ................. H01H 9/22 337/158 |
| 4,736,114 | A | * | 4/1988 | Reichl ..................... H02B 1/24 200/11 TC |
| 5,963,420 | A | * | 10/1999 | Bailey .................... H01H 9/223 200/50.02 |
| 6,989,499 | B2 | * | 1/2006 | Bortolloni ............... H01H 9/28 200/329 |
| 8,514,551 | B2 | * | 8/2013 | Cosley .................... H02B 1/32 200/50.32 |

FOREIGN PATENT DOCUMENTS

| | | | |
|---|---|---|---|
| CN | 103971960 | | 8/2014 |
| FR | 1182018 | | 6/1959 |
| FR | 1182018 | A * | 6/1959 ............ H01H 31/06 |
| KR | 20020048532 | | 6/2002 |
| KR | 20060021683 | | 3/2006 |
| KR | 2004151770000 | | 4/2006 |

OTHER PUBLICATIONS

Korean Intellectual Property Office Application No. 10-2015-0010786, Office Action dated Oct. 11, 2016, 8 pages.
Korean Intellectual Property Office Application No. 10-2015-0010786, Notice of Allowance dated Dec. 15, 2016, 6 pages.

* cited by examiner

Prior art

INTERLOCK DEVICE OF RING MAIN UNIT

CROSS-REFERENCE TO RELATED APPLICATIONS

Pursuant to 35 U.S.C. §119(a), this application claims the benefit of earlier filing date and right of priority to Korean Patent Application No. 10-2015-0010786, filed on Jan. 22, 2015, the contents of which are hereby incorporated by reference herein in its entirety.

BACKGROUND OF THE INVENTION

1. Field of the Invention

The present invention relates to an interlock device of a ring main unit, and more particularly, to an interlock device of a ring main unit in which a fuse cover can be closed in interlock with a cable cover.

2. Description of the Related Art

In general, as a device used to monitor, control and protect an electrical system configured to transmit and distribute power sent to customers through transmission and distribution, ring main unit (RMU) may be configured with an assembly of a circuit breaker, a switchgear, grounds and conductors within a structure that is sealed and insulated by SF6 gas.

Figure 1:
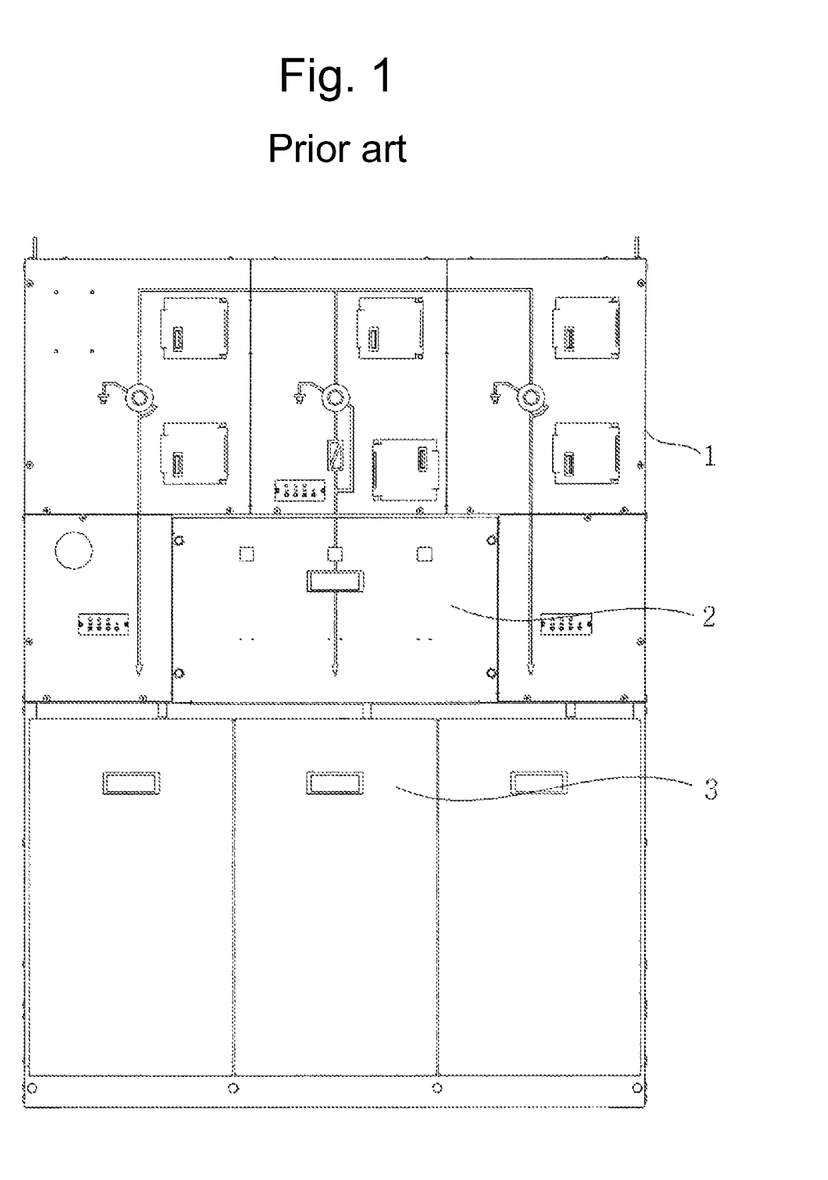
FIG. 1 is a front view illustrating a ring main unit according to the related art.
Figure 2:
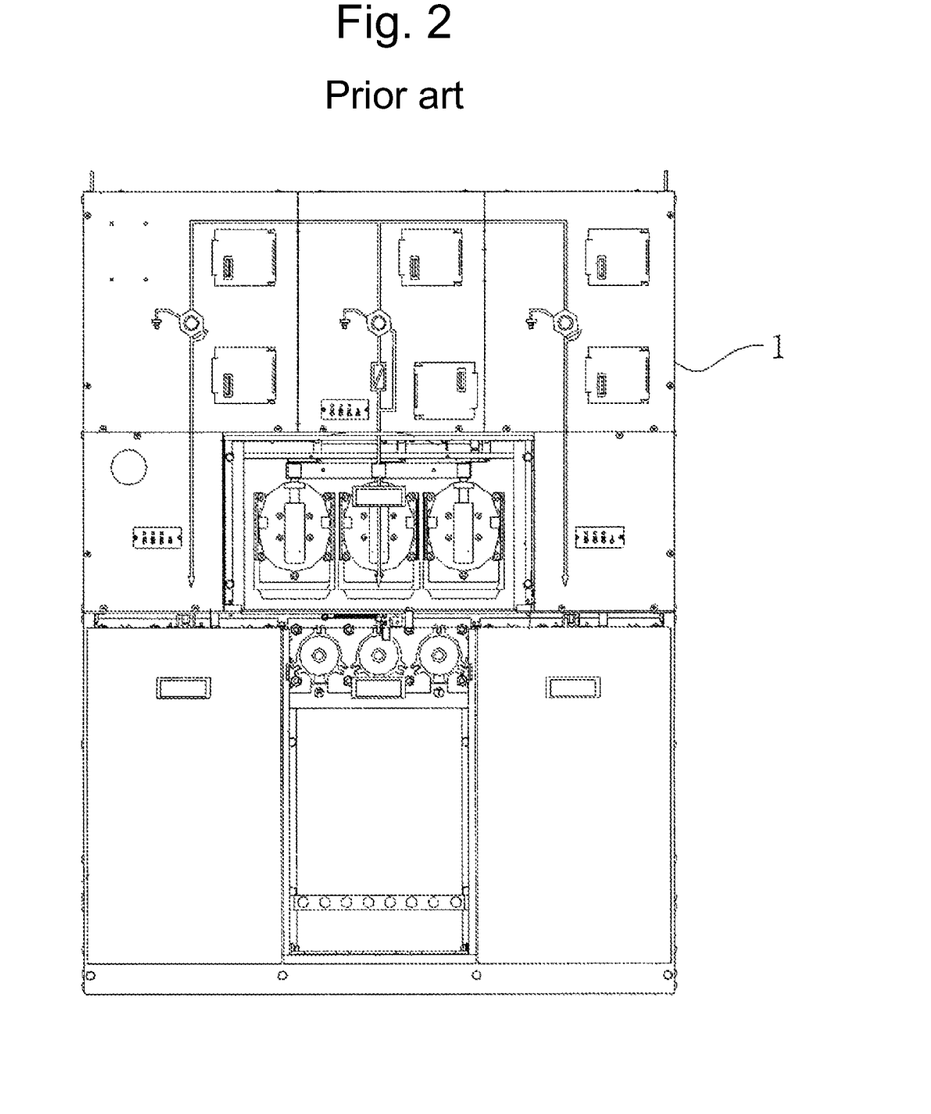
FIG. 2 is a view illustrating a state in which the fuse cover and cable cover are removed from the configuration of FIG. 1.

A ring main unit according to the related art is illustrated in FIG. 1, and a configuration in which a fuse cover and a cable cover are removed from the configuration of FIG. 1 is illustrated in FIG. 2. A fuse cover 2 and a cable cover 3 are provided on a front surface of a ring main unit 1, and various apparatus such as a circuit breaker, a switch, a disconnecting switch, an earth switch and the like are housed within the ring main unit 1 and interlock devices are provided therein to control their operations.

Among those interlock devices, an interlock device implemented in the fuse cover 2 has two types of functions. The first function is a function to allow the opening of the fuse cover 2 only when in a ground state in connection with an operating mechanism of the relevant circuit. The second function is a function to allow the opening of the cable cover 3 only in a state that the fuse cover 2 is open when both the cable cover 3 and fuse cover 2 are mounted thereon. Through this, the fuse cover 2 may be allowed to be open only when an operating mechanism of the relevant circuit is in a ground state, and the cable cover 3 may be also allowed to be open only in a state that the fuse cover 2 is open.

Furthermore, an interlock device for interlocking the operating mechanism of the relevant circuit with the fuse cover 2 may be also applied not to operate the relevant operating mechanism in a state that the fuse cover 2 is open.

However, when both the fuse cover 2 and cable cover 3 are open and then the fuse cover 2 is closed while the operating mechanism of the relevant circuit is in a ground state, the operating mechanism of the relevant circuit will be in an always operable state. In this case, the relevant circuit will be in an always-on state, and thus there is a risk of accident such as dielectric breakdown due to contact when a person approaches a cable portion through which electricity flows in an active state.

SUMMARY OF THE INVENTION

The present invention is contrived to solve the foregoing problems, and an aspect of the present invention is to provide an interlock device of a ring main unit configured to interlock a cable cover with a fuse cover so as to close the fuse cover only when the cable cover is in a closed state.

An interlock device of a ring main unit according to an embodiment of the present disclosure may include an interlock frame provided in part of the ring main unit, a cam on part of which an engaging portion is protruded and formed and on the other part of which a slit is formed, rotatably provided within the interlock frame, an operating plate an end of which is coupled to the slit to perform a vertical movement, and a spring an end of which is fixed to part of the cam to store an elastic force due to the movement of the cam.

Here, a fuse cover of the ring main unit may not be closed when the engaging portion is placed in a state of being protruded to an outside of the interlock frame.

Furthermore, a through hole into which the operating plate can be inserted may be formed on a lower surface of the interlock frame.

Furthermore, a shaft hole into which a rotating shaft configured to rotatably support the cam within the interlock frame can be inserted may be formed on part of the cam.

Furthermore, the interlock device may further include a bush provided between one sidewall of the interlock frame and the cam to rotatably support the cam.

Furthermore, the operating plate may include a front plate and a rear plate, and an engaging plate with which a cable cover can be brought into contact may be protruded and formed in a forward direction on the front plate.

Furthermore, a coupling hole provided with a coupling shaft that can be inserted into the slit may be formed on the rear plate.

Furthermore, a roller may be provided on the coupling shaft to smoothly move within the slit.

Furthermore, a guide plate configured to assist a vertical movement of the operating plate may be provided in part of the interlock frame.

Furthermore, an end of the spring may be fixed and provided on a spring hole formed on part of the cam, and the other end of the spring may be fixed and provided in part of the interlock frame.

In addition, the operating plate may be placed at a lowered position when the cable cover is closed.

According to an interlock device of a ring main unit in accordance with an embodiment of the present disclosure, a fuse cover may be closed only when a cable cover is closed and thus a main circuit may not be allowed to be on in a state that the cable cover is open, thereby obtaining an effect of preventing safety accidents.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a preferred embodiment of the present invention will be described in detail with reference to the accompanying drawings to such an extent that the present invention can be easily implemented by a person having ordinary skill in the art to which the present invention pertains, but it does not mean that the technical concept and scope of the present invention are limited due to this.

Figure 3:
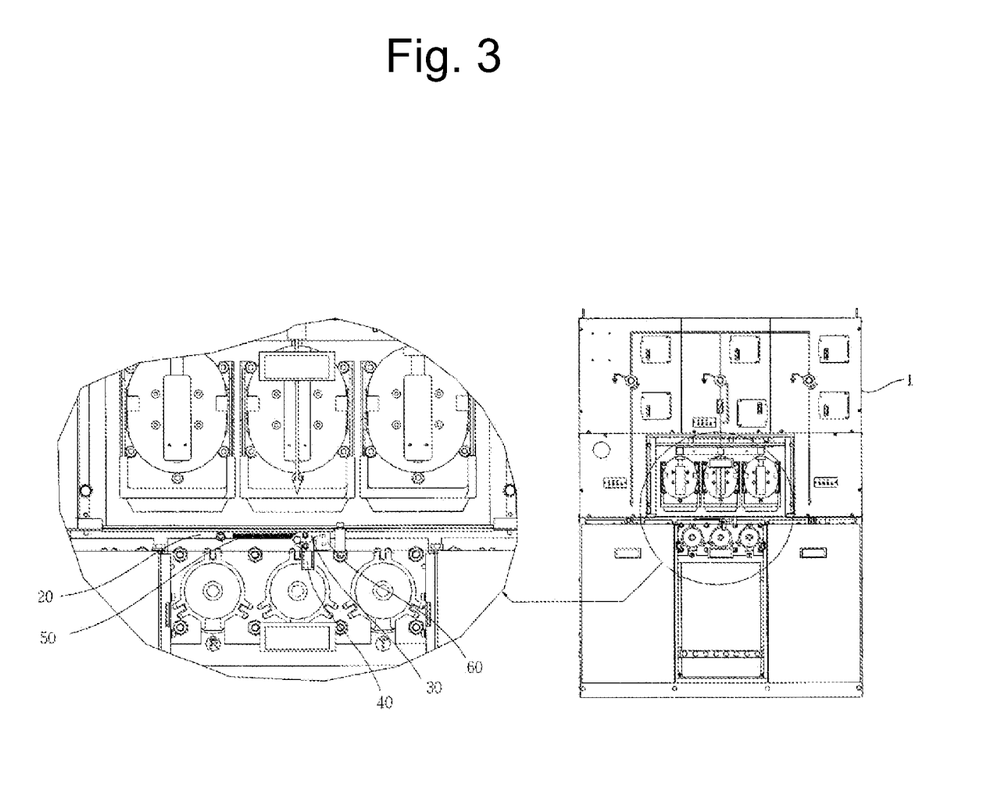
FIG. 3 is a perspective view illustrating an interlock device state when the fuse cover and cable cover are mounted in a ring main unit according to an embodiment of the present disclosure.
Figure 4:
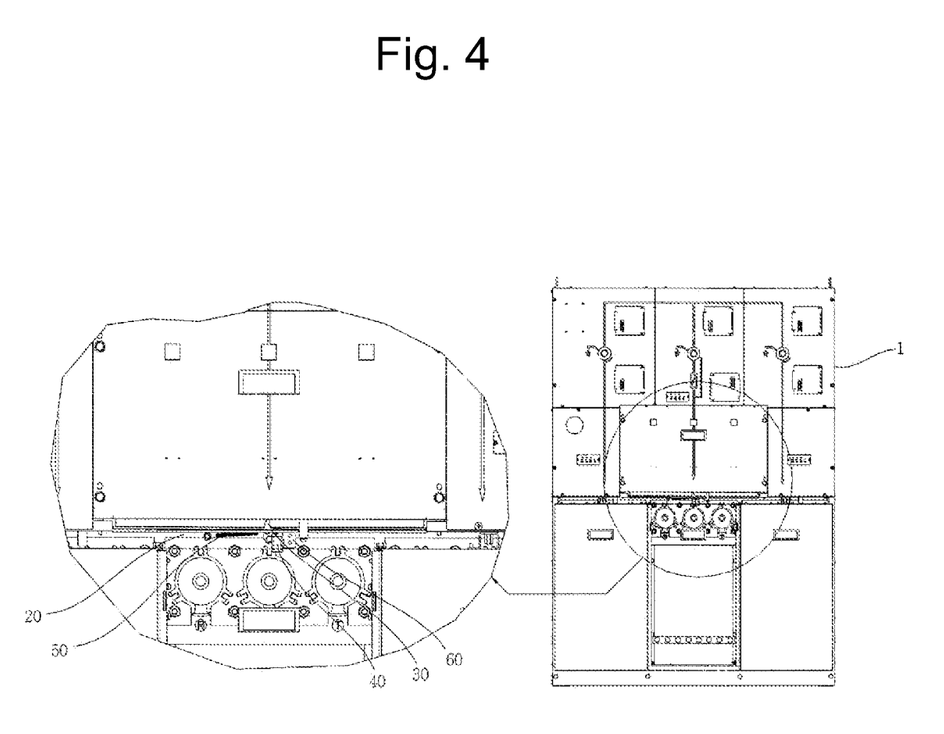
FIG. 4 is a perspective view illustrating an interlock device state when only the fuse cover is mounted and the cable cover is removed in a ring main unit according to an embodiment of the present disclosure.
Figure 5:
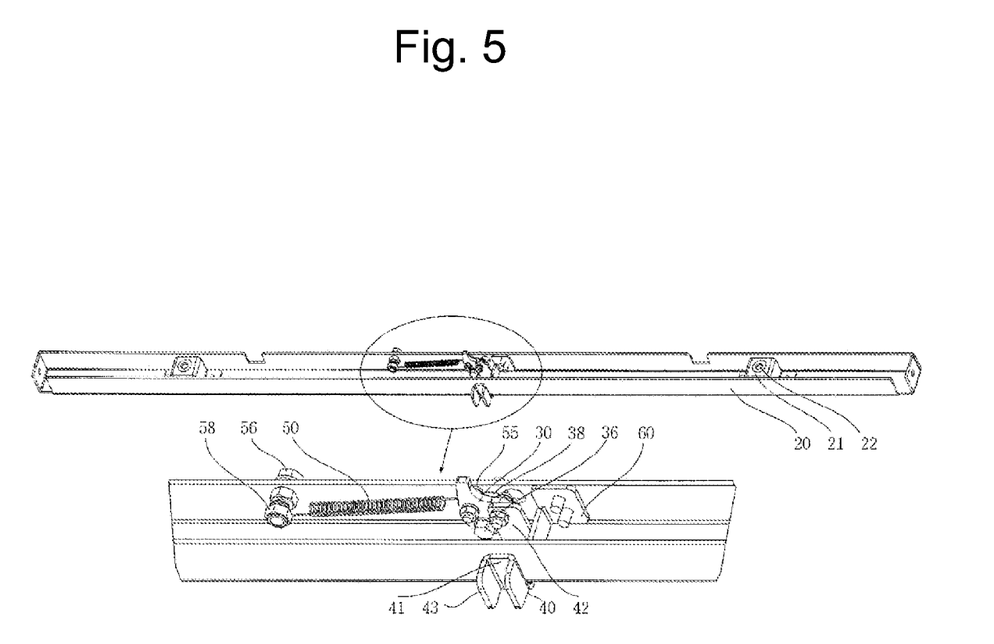
FIG. 5 is a perspective view of an interlock device in a ring main unit according to an embodiment of the present disclosure.
Figure 6:
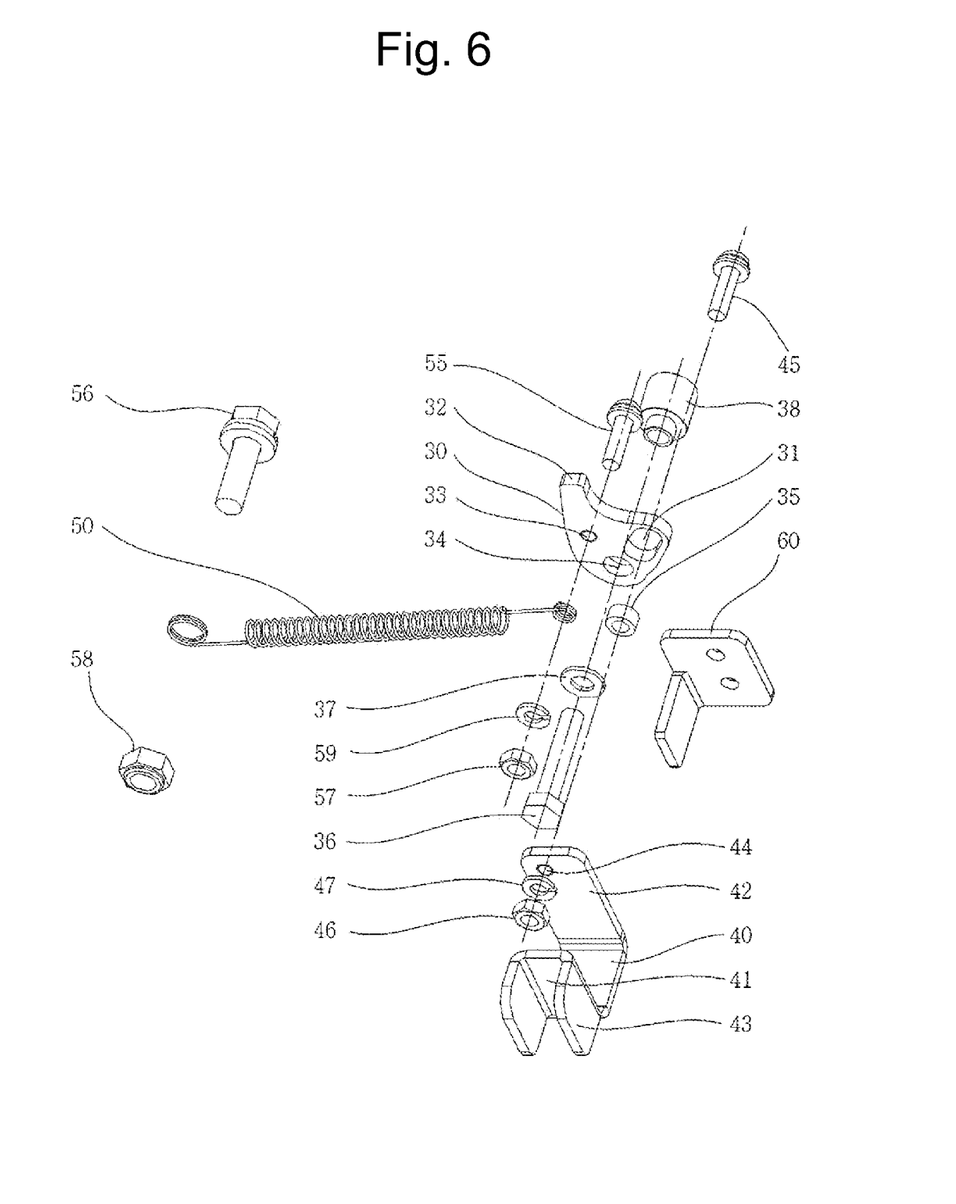
FIG. 6 is an exploded perspective view illustrating constituent elements excluding an interlock frame in FIG. 5.
Figure 8:
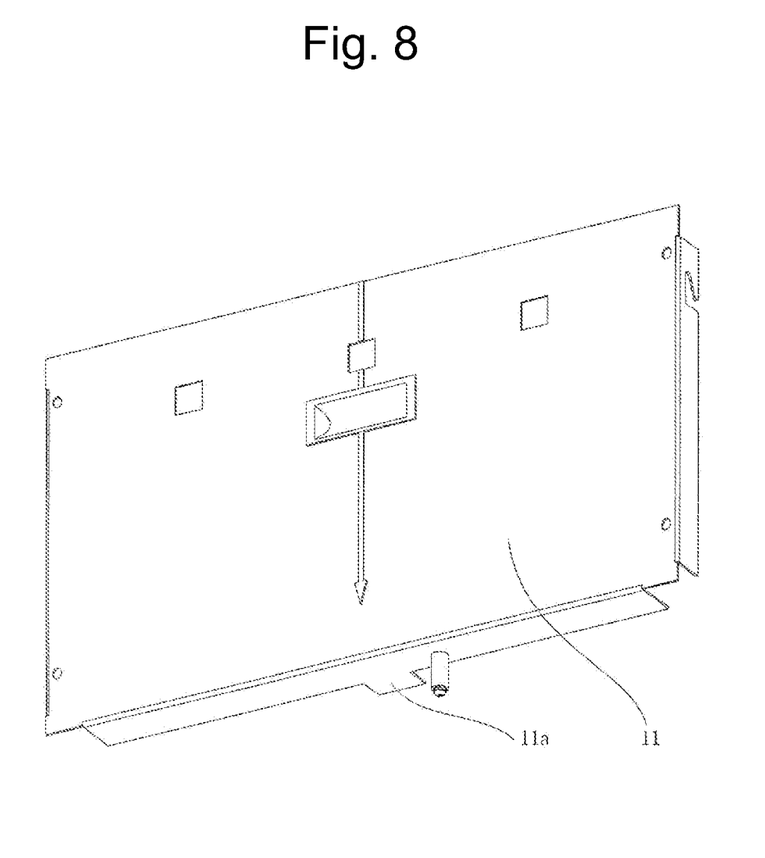
FIG. 8 is a perspective view illustrating a fuse cover applied to an embodiment of the present disclosure.
Figure 9:
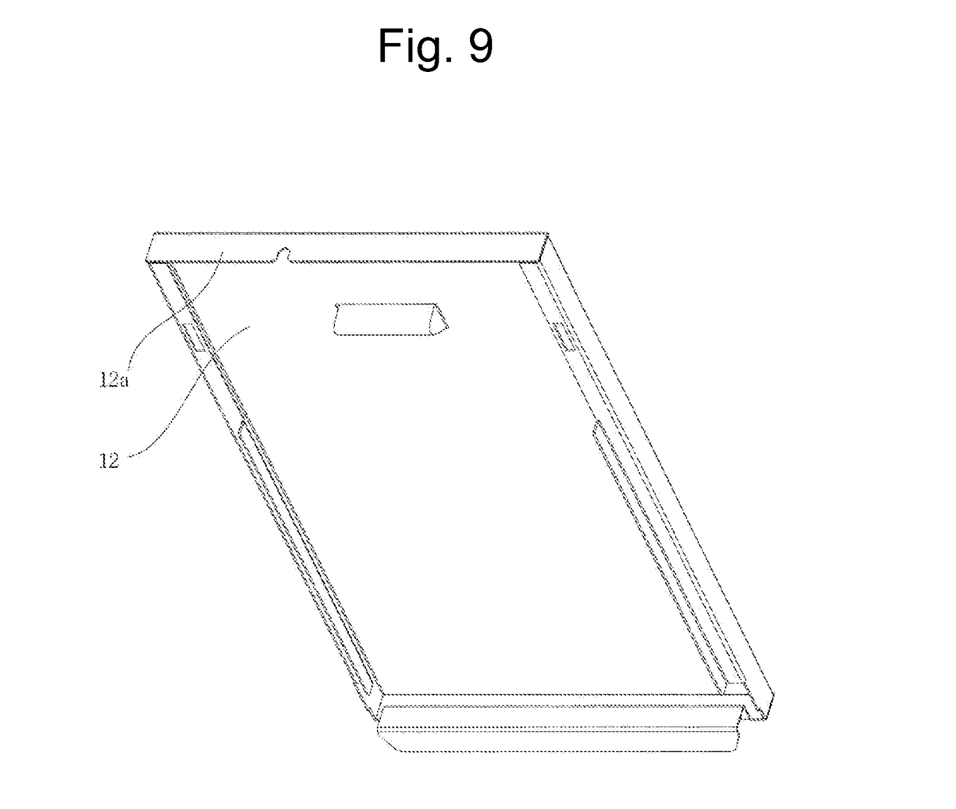
FIG. 9 is a perspective view illustrating a cable cover applied to an embodiment of the present disclosure.

FIG. 3 is a perspective view illustrating an interlock device state when the fuse cover and cable cover are mounted in a ring main unit according to an embodiment of the present disclosure, and FIG. 4 is a perspective view illustrating an interlock device state when only the fuse cover is mounted and the cable cover is removed, and FIG. 5 is a perspective view of an interlock device in a ring main unit according to an embodiment of the present disclosure, and FIG. 6 is an exploded perspective view illustrating constituent elements excluding an interlock frame in FIG. 5, and FIG. 8 is a perspective view illustrating a fuse cover applied to an embodiment of the present disclosure, and FIG. 9 is a perspective view illustrating a cable cover applied to an embodiment of the present disclosure. An interlock device of a ring main unit according to each embodiment of the present disclosure will be described in detail with reference to the drawings.

Referring to FIGS. 3 through 7, an interlock device of a ring main unit according to an embodiment of the present disclosure may include an interlock frame 20 provided in part of the ring main unit 10; a cam 30 on part of which an engaging portion 32 is protruded and formed and on the other part of which a slit 31 is formed, rotatably provided within the interlock frame 20; an operating plate 40 an end of which is coupled to the slit 31 to perform a vertical movement; and a spring 50 an end of which is fixed to part of the cam 30 to store an elastic force due to the movement of the cam 30.

The interlock frame 20 may be formed with a plate. The interlock frame 20 may be formed in a box shape in which an upper surface thereof is open. A member for installation 21 may be provided in part of the interlock frame 20, and a coupling hole 22 may be formed on the member for installation 21 and installed in part of the ring main unit 10. Here, the interlock frame 20 may be installed on a rear portion of the fuse cover 11 and cable cover 12. A through hole 23 into which the operating plate 40 which will be described later can be inserted may be formed on a lower surface of the interlock frame 20.

The cam 30 may be formed with a substantially triangular plate (of course, the cam 30 may be formed in various shapes according to the embodiments). The engaging portion 32 protruded upward may be formed at a first edge of the cam 30. Furthermore, a spring hole 33 for coupling the spring 50 thereto may be formed at the first edge of the cam 30. A slit 31 consisting of an elongated hole is formed at a second edge of the cam 30. A shaft hole 34 into which the rotating shaft 36 can be inserted to be rotatably coupled to the interlock frame 20 is formed at a third edge of the cam 30. The rotating shaft 36 rotatably supports the cam 30 within the interlock frame 20.

The rotating shaft 36 is coupled to one sidewall of the interlock frame 20 through the shaft hole 34. The rotating shaft 36 may be configured with a shaft bolt. A bush 38 may be provided to maintain a distance between the cam 30 and the interlock frame 20. The bush 38 is provided between the cam 30 and one sidewall of the interlock frame 20 to rotatably support the cam 30. A rotating ring 37 may be provided between the rotating shaft 36 and the cam 30 to reduce a rotational friction.

The operating plate 40 may be formed in a "U"-shape to have a front plate 41 and a rear plate 42. A plurality of engaging plates 43 protruded in a forward direction may be formed on the front plate 4. The engaging plate 43 is a portion with which an upper surface 12a of the cable cover 12 which will be described later is brought into contact.

A coupling hole 44 is formed on part of the rear plate 42 of the operating plate 40 to install a coupling shaft 45 passing through the slit 31. The coupling shaft 45 may be configured with a shaft bolt. A nut 46 and a washer 47 may be provided to fix the coupling shaft 45.

The operating plate 40 is coupled to the slit 31 of the cam 30 in a sliding manner by means of the coupling shaft 45. Here, a roller 35 may be provided to smoothly move the coupling shaft 45 on the slit 31. The roller 35 is provided between the coupling shaft 45 and the slit 31 to smoothly perform the movement of the operating plate 40.

A guide plate 60 is provided to assist a vertical movement of the operating plate 40. The guide plate 60 is provided in part of the interlock frame 20 to support the rear plate 42 of the operating plate 40. The operating plate 40 may perform a vertical movement by means of the guide plate 60.

Figure 7:
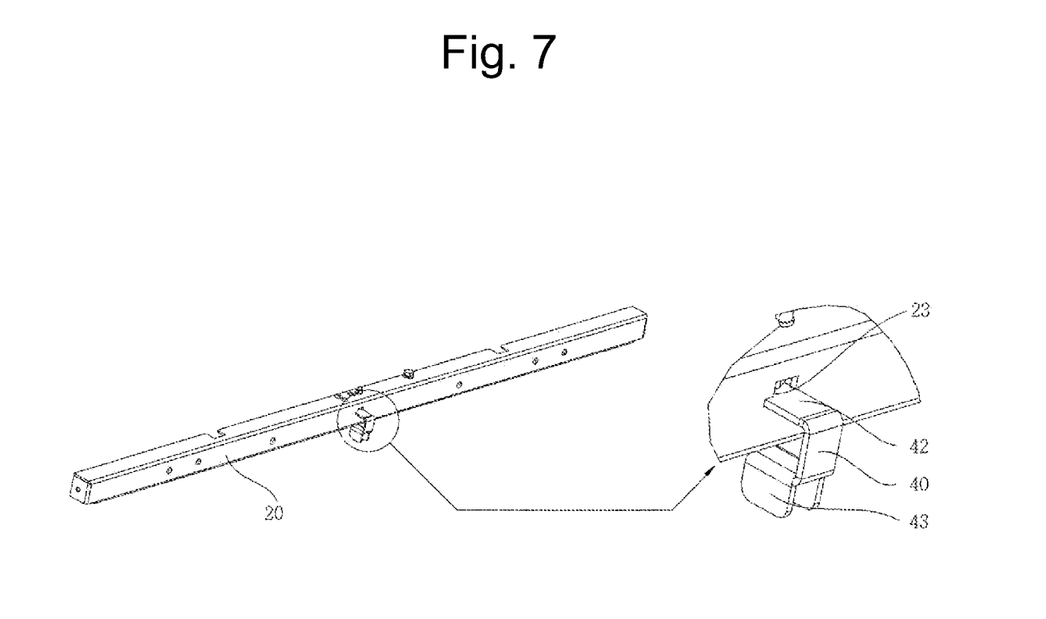
FIG. 7 is a bottom perspective view of FIG. 5.

The rear plate 42 of the operating plate 40 is inserted and provided into a through hole 23 of the interlock frame 20. In other words, the operating plate 40 performs a vertical movement through the through hole 23. As a result, the operating plate 40 performs only a vertical movement without being rotated or swayed by means of the through hole 23.

A spring 50 is provided to transfer the cam 30 to a position on which the engaging portion 32 faces upward. An end of the spring 50 is fixed and provided on a spring hole 33 formed at a first edge of the cam 30, and the other end of the spring 50 is fixed and provided in part of the interlock frame 20. Bolts 55, 56, nuts 57, 58 and a washer 59 may be provided to fix the spring 50. The spring 50 may be configured with an elastic coil spring.

The operation of an interlock device in a ring main unit according to an embodiment of the present disclosure will be described with reference to FIGS. 3, 4 and 8 through 11.

Figure 10:
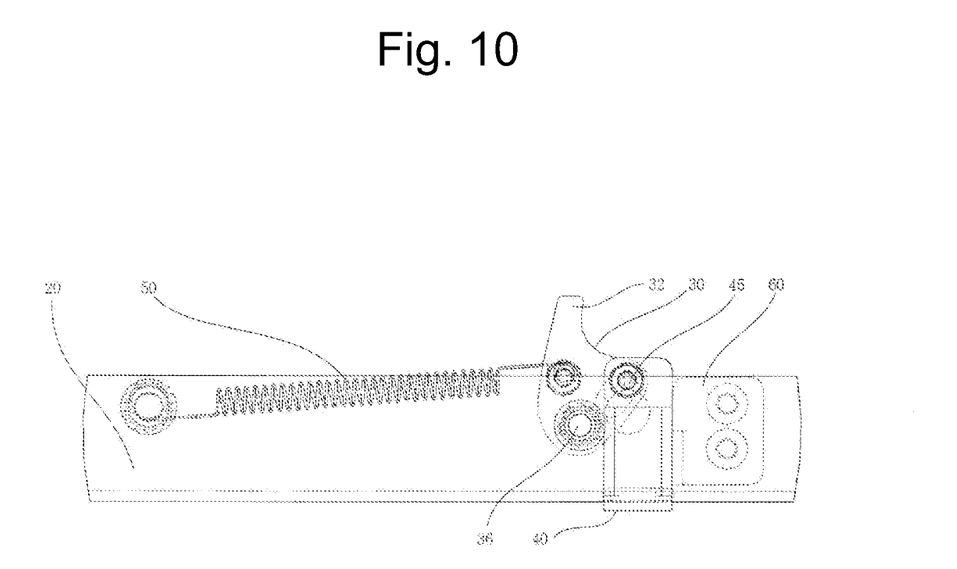
FIG. 10 is an operational state diagram of an interlock device according to the present disclosure illustrating a state in which the cable cover is separated.

When an external force is not applied thereto, the cam 30 receives a force of the spring 50 and is located at a position on which the engaging portion 32 faces upward. The engaging portion 32 of the cam 30 is protruded upward, and therefore, the fuse cover 11 is placed in a non-closed state. Specifically, the engaging portion 32 of the cam 30 is engaged with a protruded surface 11a of the fuse cover 11, and thus fuse cover 11 is unable to be closed.

Figure 11:
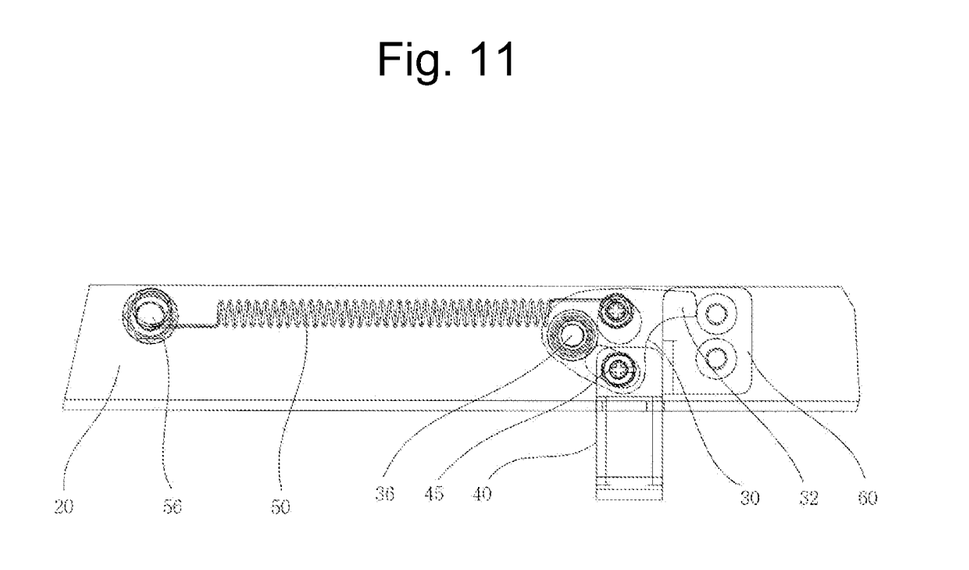
FIG. 11 is an operational state diagram of an interlock device according to the present disclosure illustrating a state in which the cable cover is mounted.

The cable cover 12 is closed in a manner of being pushed downward from the top. When the cable cover 12 is closed, the upper surface 12a of the cable cover 12 pushes the engaging plate 43 in a downward direction to move the operating plate 40 downward. As the operating plate 40 moves downward, the coupling shaft 45 provided at a second edge of the cam 30 rotates the cam 30 in a clockwise direction while moving downward such that the engaging portion 32 is hidden inside the interlock frame 20. Here, the vertical movement of the operating plate 40 is smoothly converted into a rotational movement of the cam 30 by means of the roller 35 operating within the slit 31 as described above. As the engaging portion 32 is hidden inside the interlock frame 20, the fuse cover 11 is closed.

According to an interlock device of a ring main unit in accordance with an embodiment of the present disclosure, the fuse cover may be closed only when the cable cover in interlock with the fuse cover is closed.

As a result, opening both the fuse cover and cable cover in a state that the operating mechanism of the relevant circuit is grounded and then closing only the fuse cover in a state that the cable cover is not closed may be prevented, thereby obtaining an effect of preventing safety accidents.

The foregoing embodiments are embodiments for implementing the present disclosure, and it will be apparent to those skilled in this art that various changes and modifications may be made thereto without departing from the gist of the present invention. Accordingly, it should be noted that the embodiments disclosed in the present invention are only illustrative and not limitative to the concept of the present invention, and the scope of the concept of the invention is not limited by those embodiments. The scope protected by the present invention should be construed by the accompanying claims, and all the concept within the equivalent scope of the invention should be construed to be included in the scope of the right of the present invention.

What is claimed is:

1. An interlock device of a ring main unit, the ring main unit comprising a fuse cover and a cable cover provided at a bottom of the fuse cover, the interlock device comprising:
   an interlock frame on a rear portion of the fuse cover and the cable cover;
   a rotatable cam within the interlock frame;
   a protruding engaging portion formed on a first part of the cam; and
   formed on a second part of the cam;
   an operating plate on the interlock frame, the operating plate moving vertically downward when the cable cover is closed and an end of the operating plate coupled to the slit to cause the cam to rotate; and
   a spring pulling the cam into a position where the engaging portion protrudes outside of the interlock frame, a first end of the spring fixed to a portion of the cam to store an elastic force due to movement of the cam,
   wherein the engaging portion prevents the fuse cover from closing when the engaging portion is moved such that it protrudes outside the interlock frame, and
   wherein the fuse cover is prevented from closing when the cable cover is not closed.

2. The interlock device of claim 1, wherein a through hole into which the operating plate is inserted is formed on a lower surface of the interlock frame.

3. The interlock device of claim 1, further comprising:
   a rotating shaft configured to support the cam within the interlock frame,
   wherein a shaft hole into which the rotating shaft is inserted is formed on a portion of the cam.

4. The interlock device of claim 3, further comprising:
   a bush provided between one sidewall of the interlock frame and the cam to support the cam.

5. The interlock device of claim 1, wherein:
   the operating plate comprises a front plate and a rear plate; and
   the front plate comprises a forward protruding engaging plate that is brought into contact with the cable cover.

6. The interlock device of claim 5, wherein the rear plate comprises a coupling hole having a coupling shaft that is inserted into the slit.

7. The interlock device of claim 6, wherein the coupling shaft comprises a roller that smoothly moves within the slit.

8. The interlock device of claim 1, wherein the interlock frame comprises a guide plate to assist the vertical movement of the operating plate.

9. The interlock device of claim 1, wherein:
   the first end of the spring is fixed in a spring hole formed on the portion of the cam; and
   a second end of the spring is fixed to a portion of the interlock frame.

* * * * *